United States Patent
Blaha et al.

[11] Patent Number: 5,119,307
[45] Date of Patent: Jun. 2, 1992

[54] METHOD AND SYSTEM FOR AUTOMATED BILL-OF-MATERIAL GENERATION

[75] Inventors: Michael R. Blaha, Niskayuna; William J. Premerlani, Scotia; James E. Rumbaugh; Robert M. Salemme, both of Schenectady, all of N.Y.

[73] Assignee: General Electric Company, Schenectady, N.Y.

[21] Appl. No.: 455,042

[22] Filed: Dec. 22, 1989

[51] Int. Cl.$^5$ .............................................. G06F 15/46
[52] U.S. Cl. ................................... 364/468; 395/919
[58] Field of Search ............... 364/512, 513, 191–193, 364/401, 402, 403, 474.24, 468; 395/919

[56] References Cited

U.S. PATENT DOCUMENTS

| | | | |
|---|---|---|---|
| 3,715,730 | 2/1973 | Smith et al. | 340/172.5 |
| 4,149,246 | 4/1979 | Goldman | 364/200 |
| 4,275,449 | 6/1981 | Aish | 364/512 |
| 4,459,663 | 7/1984 | Dye | 364/403 X |
| 4,591,983 | 5/1986 | Bennett et al. | 364/403 |
| 4,598,376 | 7/1986 | Burton et al. | 364/470 |
| 4,604,718 | 8/1986 | Norman et al. | 364/468 X |
| 4,646,238 | 2/1987 | Carlson, Jr. et al. | 364/468 X |
| 4,656,603 | 4/1987 | Dunn | 364/900 |
| 4,658,370 | 4/1987 | Erman et al. | 364/513 |
| 4,727,487 | 2/1988 | Masui et al. | 364/300 |
| 4,734,856 | 3/1988 | Davis | 364/300 |
| 4,847,761 | 7/1989 | Ferriter et al. | 364/401 |
| 4,862,376 | 8/1989 | Ferriter | 364/468 |
| 4,870,591 | 9/1989 | Cicciarelli et al. | 364/468 |

OTHER PUBLICATIONS

"Relational Database Design Using An Object-Oriented Methodology" by Michael R. Blaha et al., Communications of the ACM, vol. 31, No. 4, Apr. 1988, pp. 414–427.

Blaha et al., "An Extensible AE&C Database Model", Computers chem. Engng., vol. 13, No. 7, 1989. pp. 753–766.

Loomis et al., "An Object Modeling Technique For Conceptual Design", Proceedings of European Conference on Object-Oriented Programming, Paris, Jun. 1987.

Rumbaugh, "Relations as Semantic Constructs in an Object-Oriented Language", OOPSLA '87 Proceedings, Orlando, Oct. 1987, pp. 1–16.

Primary Examiner—Joseph Ruggiero
Attorney, Agent, or Firm—Gene Bolmarcich; James C. Davis, Jr.; Paul R. Webb, II

[57] ABSTRACT

A computer implemented process and apparatus for selecting components of an assembly from input design specifications and displaying the selected component to a system user is provided. The selected components can be displayed in one of many formats including in a bill-of-material format. In one embodiment, the apparatus includes selection means for selecting a component from input design specifications and display means for displaying the selected assembly components.

14 Claims, 12 Drawing Sheets

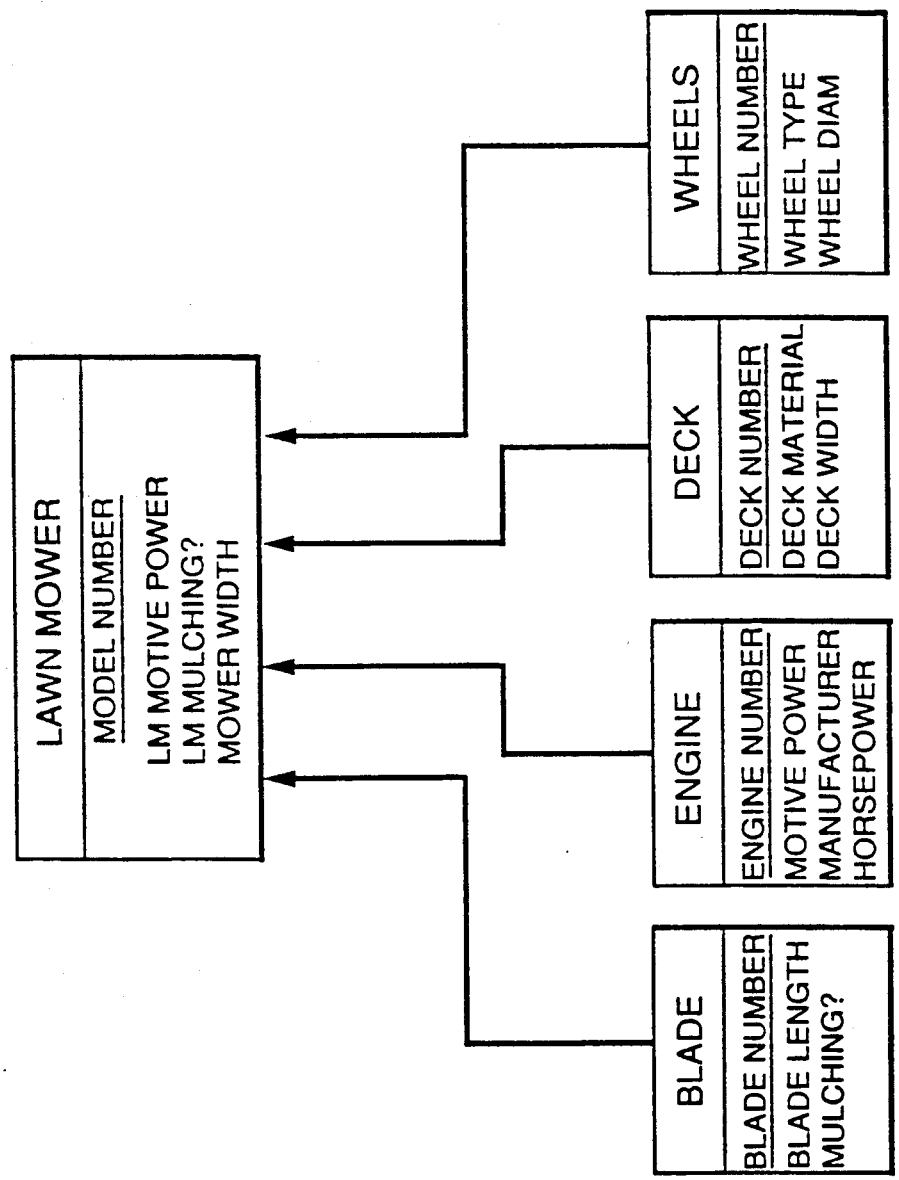

LAWN MOWER

| MODEL NUMBER | LM MOT POWER | LM MULCH? | MOWER WIDTH | BLADE NUM | ENG NUM | DECK NUM | WHEEL NUM |
|---|---|---|---|---|---|---|---|
| LM16G | GAS | YES | 16 | B16M | E1 | D16 | W3 |
| LM16E | ELEC | YES | 16 | B16M | E1E | D16 | W3 |
| LM18G | GAS | YES | 18 | B18M | E2 | D18 | W4 |
| LM20G | GAS | NO | 20 | B20 | E2 | D20S | W5P |
| LM20E | ELEC | NO | 20 | B20 | E2E | D20 | W5 |
| LM22G | GAS | NO | 22 | B22 | E3 | D22S | W5P |

BLADE

| BLADE NUM | BLADE LENGTH | MULCH? |
|---|---|---|
| B16M | 16 | YES |
| B18M | 18 | YES |
| B20 | 20 | NO |
| B22 | 22 | NO |

ENGINE

| ENG NUM | MOT POWER | MANUF | HP |
|---|---|---|---|
| E1 | GAS | ULTRADURE | 1 |
| E2 | GAS | ULTRADURE | 2 |
| E3 | GAS | ZAPRO | 3 |
| E1E | ELEC | ZAPRO | 1 |
| E2E | ELEC | CHEAPCO | 2 |

DECK

| DECK NUM | DECK MATL | DECK WIDTH |
|---|---|---|
| D16 | ALUM | 18 |
| D18 | ALUM | 20 |
| D20 | ALUM | 22 |
| D20S | STEEL | 22 |
| D22S | STEEL | 24 |

WHEEL

| WHEEL NUM | WHEEL TYPE | WHEEL DIAM |
|---|---|---|
| W3 | SOLID | 3 |
| W4 | SOLID | 4 |
| W5 | SOLID | 5 |
| W5P | PNEU | 5 |

FIG. 5

(MOWER WIDTH + LM MOTIVE POWER) ⟶ DECK NUM (MOWER WIDTH + DECK MATL) ⟶ WHEEL NUM

DECK SELECTION

| DECK NUM | MOWER WIDTH | LM MOTIVE POWER |
|---|---|---|
|  |  |  |

WHEEL SELECTION

| WHEEL NUM | MOWER WIDTH | DECK MATL |
|---|---|---|
|  |  |  |

FIG. 7

METHOD AND SYSTEM FOR AUTOMATED BILL-OF-MATERIAL GENERATION

The present invention relates to a computer-based assembly system, and more specifically, to a computer implemented process and system which generate a bill-of-material for existing as well as new articles and automatically configure product assemblies.

BACKGROUND OF THE INVENTION

Speed, simplicity and self-confidence are important elements in becoming and maintaining a competitive business. As competitiveness in a marketplace increases, quickly responding to specific demands within the market becomes increasingly important. If one competitor fails to quickly respond to a consumer's demand, then the consumer's demand may substantially decrease, at least with regard to products of the one competitor. The consumer may use a suitable substitute product from another competitor.

Many factors contribute to slowing the process of bringing a product to market, thereby weakening the competitiveness of a business. Complexity of a product contributes to the difficulties in meeting specific consumer demands in a timely manner. The complexity of world-wide production, the changing nature of competition, and even the complexity internal to production companies, generally slow the process of bringing a new or even modified product to market.

For example, motors generally are complex products, and in order to meet specific consumer demands, a complex design and implementation process must be completed. For the consumer, however, the time period required for delivery may be too long. The consumer may therefore resort to substitute products of another competitor.

In order to speedup the pace at which consumer demands for a new or modified product are satisfied, manufacturers utilize bill-of-material systems. The term "bill-of-material", as generally understood in the art and as used herein, refers to a parts explosion listing. Specifically, a product may have many subassemblies, some or all of which may have further subassemblies. A bill-of-material is a printed-out parts list having indentations where the indentations correspond to a depth of hierarchy of each product in each subassembly. The bill-of-material traditionally has been utilized during the manufacturing process of an assembly to provide a reference for the relationship of each component to other components in the assembly.

An example of a system for generating a bill-of-material is described in Ferriter et al., U.S. Pat. No. 4,847,761. In the Ferriter et al. system, a bill-of-material generation process begins by producing a functional model of a product design. In order to generate the functional model, the user must know each part required to meet the design specifications, i.e. the user must formulate and apply rules to determine proper subassemblies. The functional model is in the form of a hierarchy tree structure. The tree structure is assigned an item number and stored in a database. Once a tree structure for a product is established, a user can view the hierarchical tree, check it for correctness and modify it, if necessary. From this tree structure, the Ferriter et al. system generates a bill-of-material.

With known systems, such as the system described in the above-identified patent, in order to generate a bill-of-material for a specific assembly, a user must first input a functional model into a database. Inputting functional models for each assembly is a time-consuming process. For example, in a motor context, each motor contains many subassemblies such as a rotor assembly, stator assembly, frame, end shield, and other parts. Many components, such as the rotor assembly, further decompose into more subassemblies, such as a shaft, laminations, nuts, and bolts. In practice, therefore, full automation for bill-of-material generation for all model designs would take many man-years to implement. By the time such a complete system was implemented, the models probably would be partially out of date and require additional modeling.

Design accuracy and consistency with these known systems is highly dependent upon the expertise of a person who creates and enters the functional model for each new product. These known systems therefore also are susceptible to errors and inconsistent design techniques. Further, in order to implement a new design technique, each model must be reanalyzed and structured. This process also is very time-consuming and increases the cost and time required to bring a product to market.

Moreover, and importantly, although identifying component parts aids in speeding the process of bringing a product to a market, until now, no known system provides generation of an assembly hierarchy from design specifications alone. Specifically, no known bill-of-material system provides that a new or modified product can be automatically designed using assembly hierarchy information of previously designed products. Further, no known system automatically acquires rules which guide construction of a new product and its bill-of-material. Automatically constructing assembly hierarchies and generating rules to guide construction of a new product further reduces the time required to bring new and modified products to market.

It is therefore an object of the present invention to provide an automated bill-of-material generation system which generates a bill-of-material from design specifications.

Another object of the present invention is to provide an automated bill-of-material generation system which facilitates bringing a new or modified product to a market within a short period of time.

Still another object of the present invention is to provide an automated bill-of-material generation system which enables electronic storage of all variations of a specific assembly.

Yet another object of the present invention is to provide an automated bill-of-material generation system which enhances the accuracy and consistency of design techniques.

Still yet another object of the present invention is to provide an automated bill-of-material generation system which automatically generates assembly hierarchies and automatically generates rules to guide construction of new or modified products.

Another object of the present invention is to provide an automated bill-of-material generation system which reduces the cost in bringing a product to market.

Still another object of the present invention to provide an automated bill-of-material generation system which facilitates speed, simplicity and self-confidence in bringing a product to market.

SUMMARY OF THE INVENTION

The present bill-of-material configuration system provides that a system user need only input design specifications into the system, and from the design specification alone, a bill-of-material for an assembly which satisfies the design specifications is generated. In accordance with the present invention, assembly tables and partially-ordered selection criteria tables populated with assembly data are generated. The selection criteria tables express assembly data as rules and control selection of proper components which will result in an assembly that satisfies the desired design specifications.

In operation, when a system user inputs design specifications, the system scans the selection criteria tables, applies rules expressed in the selection tables, and determines component parts, including subassemblies, which satisfy the required design specifications for the particular assembly. The system then scans the assembly table, identifies the determined component and its relationship to other components, and generates a bill-of-material for the assembly. The component parts are then made available to the system user, for example, in a bill-of-material format to guide construction of the assembly.

The present invention does not require that a system user input a functional model for each product. Rather, using on-line operations, the system user only enters design specifications for an assembly. Moreover, design accuracy and consistency of the present system are not dependent upon the expertise of a system user entering the design specifications. The present system therefore reduces errors which may result from inconsistent design techniques. Also, in order to implement a new design technique, the present system can be easily modified so that the stored data and rules conform to the new design technique.

The present bill-of-material system, by providing that new and modified products can be automatically designed from design specifications alone, reduces the time required to bring a new or modified product to market. The present system thus increases competitiveness and allows a manufacturer to meet specific demands of a consumer in a more timely manner. Importantly, the present system facilitates speed, simplicity and self-confidence in bringing a product to market.

BRIEF DESCRIPTION OF THE DRAWINGS

These and other objects of the present invention, together with further features and advantages thereof, will be apparent from the following detailed specification when read together with the accompanying drawings, in which:

FIG. 4 is an object oriented representation of a lawn mower;

FIG. 5 illustrates populated assembly model tables in accordance with the present invention;

FIG. 6 illustrates typical rules which would be utilized by the present invention in a lawn mower context;

FIG. 7 illustrates empty selection criteria tables in a lawn mower context;

DETAILED DESCRIPTION OF THE DRAWINGS

The present invention is directed to a system architecture and method for automated generation of a bill-of-material, and the present invention is not directed to any particular set of rules for carrying out a particular bill-of-material generation process. Therefore, although the present invention may be described herein with reference to, for example, motors and lawn mowers, such examples are for illustrative purposes only. The present invention may be utilized to generate a bill-of-material for many other assemblies and process, including even computer software. Further, the present system architecture and method are to be practiced on a computer. The present invention, however, is not limited to practice on one specific computer.

Figure 1:
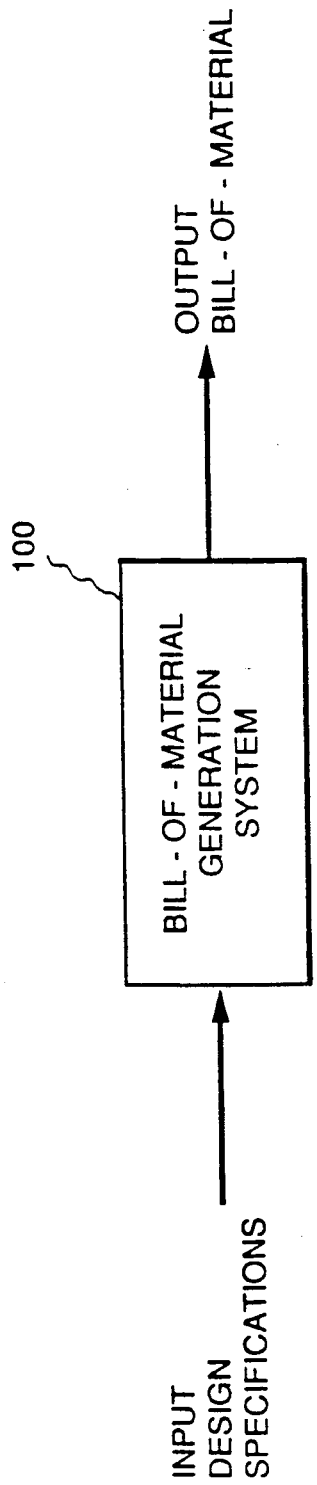
FIG. 1 is a high level block diagram of the present bill-of-material generation system.

Referring now more particularly to the drawings, FIG. 1 illustrates, in a high-level block diagram, a bill-of-material configuration system in accordance with the present invention. Specifically, as shown in FIG. 1, a system user supplies design specifications to a bill-of-material generation system identified at block 100. The term "system user" as used herein refers to a human operator, another computer, or a combination human-computer operator. It should be understood, therefore, that the term "system user" is not limited to meaning a human operator. The term "design specification", as known in the art and as used herein, means desired characteristics of an assembly. For example, in a lawn mower context, one design specification may be the width of the mower. Output from the present bill-of-material generation system, as shown in FIG. 1, comprises an indented list of parts, i.e. a bill-of-material.

The high level block diagram in FIG. 1 is shown to illustrate and emphasize that the present invention, from design specifications alone, automatically generates a bill-of-material and automatically configures product assemblies. As explained in more detail hereinafter, the present system utilizes assembly model tables and selection criteria tables comprising rules and assembly data to automatically generate the bill-of-material. On the other hand, with known bill-of-material systems, a system user inputs a functional sketch of an assembly such as in the form of a hierarchy tree structure, and from this tree structure, a bill-of-material for the assembly is generated. Known systems do not utilize or extract rules from past design and previously stored data for more automated bill-of-material generation. By requiring the system user to only input design specifications in order to generate bills-of-material, as in the present invention, the time required to bring a new product to market may be substantially reduced.

Figure 2A:
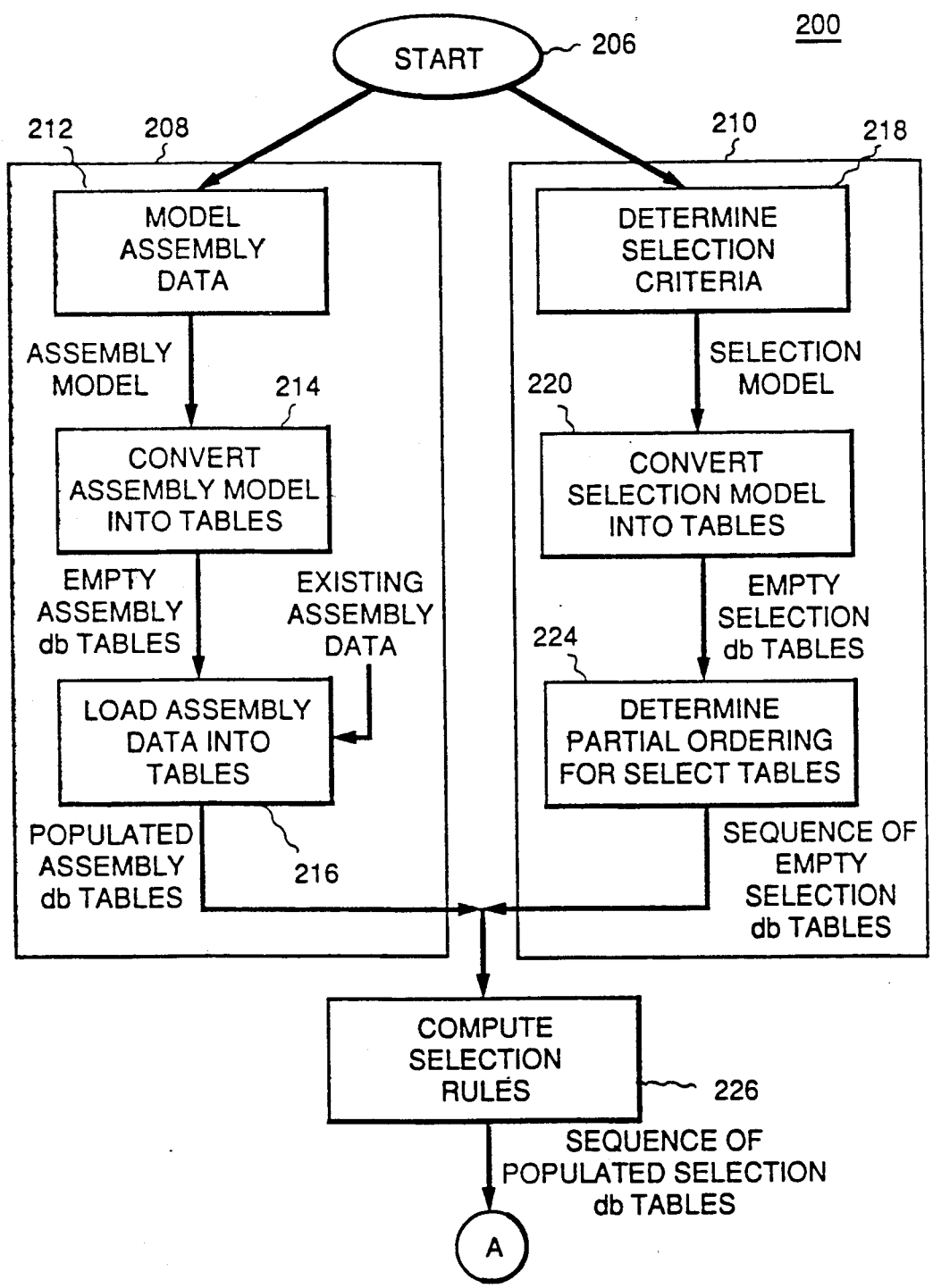
FIG. 2a and 2b is a flowchart illustrating the present system.
Figure 2B:
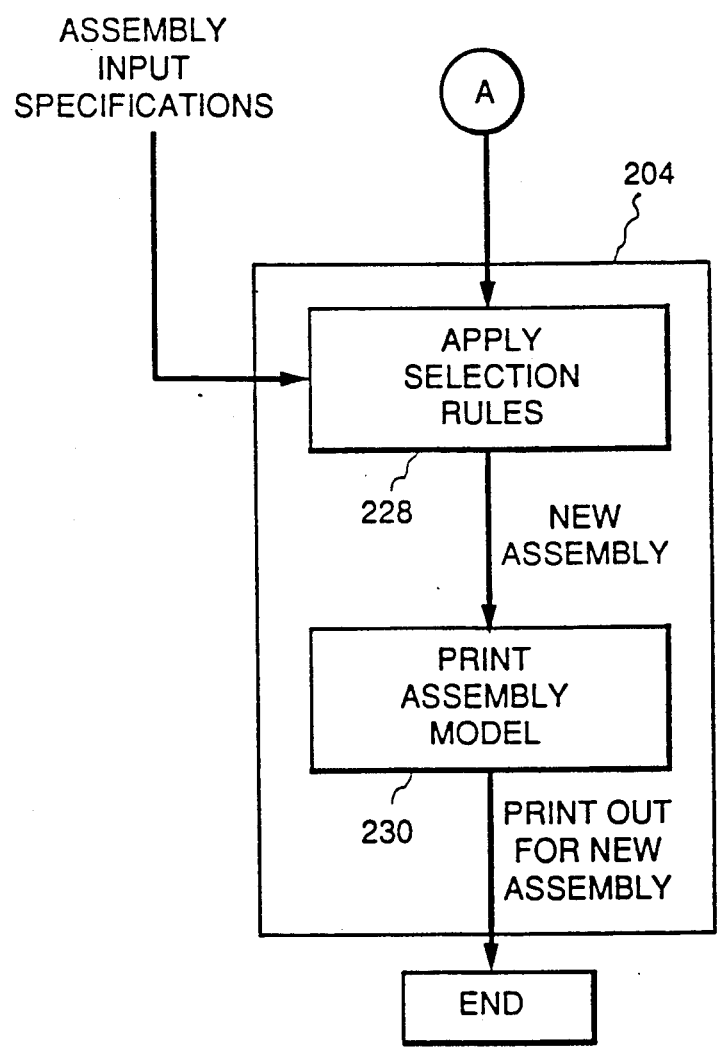

FIG. 2 illustrates, in a more detailed flow diagram 200, the sequence of process steps required to make and use the present bill-of-material generation system. Specifically, a sequence of steps required to make the present system is illustrated in "off-line" section 202 and a sequence of steps required to use the present system is illustrated in "on-line" section 204. As used herein, the term "off-line" means independent in time from actual generation of a bill-of-material, and the term "on-line" means in substantially or near real-time with actual generation of the bill-of-material.

To further facilitate a better understanding of the present invention, the sequence of process steps is described herein with reference to an example illustrated in FIGS. 3 to 8. The example shown in FIGS. 3 to 8 illustrates how the present invention would be made and used in a lawn mower context. The example is shown for illustrative purposes only.

Referring now more specifically to FIG. 2, once the off-line process is initiated as indicated at "START" block 206, an assembly table generation process 208 and a selection table generation process 210 are begun. Although shown as being performed in parallel, these processes could be performed in series in any sequential order.

Figure 3:
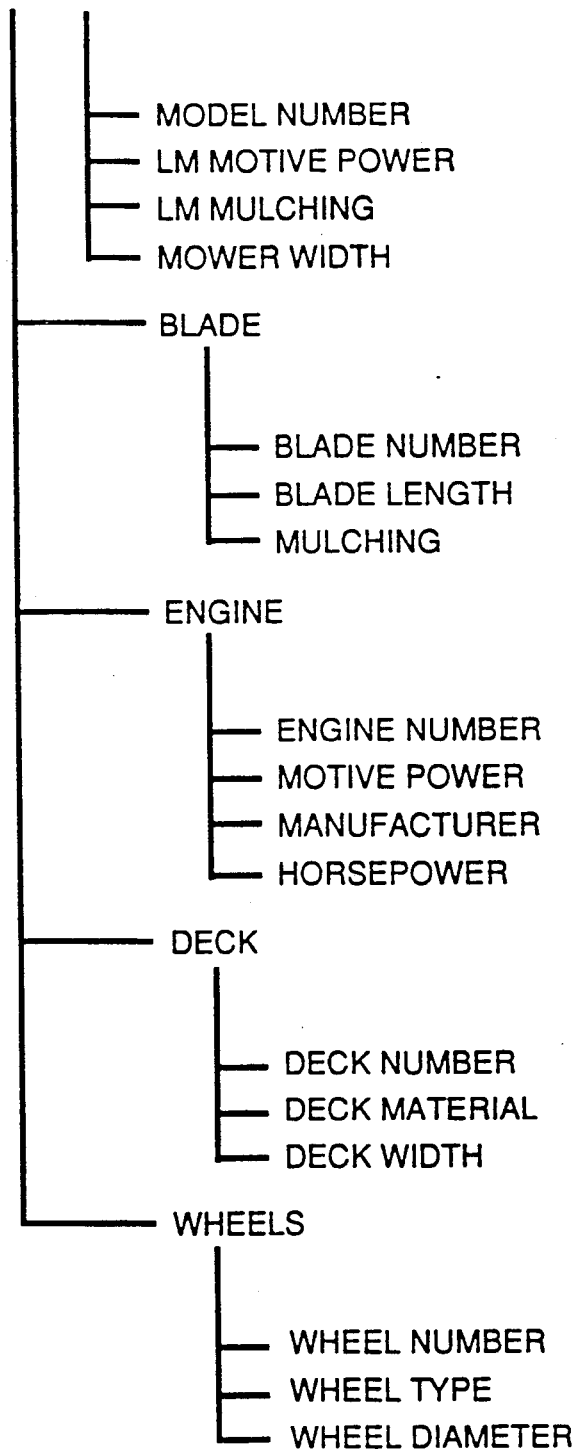
FIG. 3 is an example of a hierarchal representation for a lawn mower.

In assembly table generation process 208, and as indicated at block 212, a system user first models product structure and determines which parts, i.e. subassemblies, compose a complete assembly. In a lawn mower context, and as shown in FIG. 3, many parts would compose the assembly and only one level of subassemblies is shown in FIG. 3. Many other subassemblies are contemplated in the lawn mower context. Note that the model created by the system user may be in one of many forms and, for example, may even be in hierarchical tree form described in Ferriter et al., U.S. Pat. No. 4,847,761.

The next step in the assembly table generation process, as indicated at block 214, is to convert the assembly model into tables. The preferred table format results from utilizing a technique known as the Object Modeling Technique described in Blaha et al., "Relational Database Design Using An Object-Oriented Methodology," Communications of the ACM, 31, 4, April, 1988, which is incorporated herein, in its entirety, by reference.

In the lawn mower context, the tables which would be created by using the Object Modeling Technique for the model shown in FIG. 3 are illustrated in FIG. 4. Each box in FIG. 4 denotes an object class and each object class corresponds to part of a relational database management system table. The model includes connectivity in a hierarchal format, illustrated as lines with arrows at their ends. Specifically, a blade, an engine, a deck and wheels each compose a lawn mower. A lower portion of each box sets forth attributes for each object class. Attributes which are underlined are the primary, i.e. uniquely identifying, attributes.

The specific configuration for the assembly tables for each assembly may be in one of many forms, and the present invention is not limited to any particular format. For example, as shown in FIG. 5 and in the lawn mower context, the table labelled "Lawn mower" may include information from the "Lawn mower" block in FIG. 4, and information related to the primary attribute of each subassembly. Each subassembly, as shown in FIG. 5, may also be represented in a respective block, i.e. a "Blade" block, a "Deck" block, an "Engine" block and a "Wheel" block.

The next, and generally final, step in the assembly table generation process is to load assembly data into the generated tables as indicated at block 216. If the assembly data is stored electronically, the assembly table could be populated through an electronic transfer of data. If, however, the assembly data is not stored in a compatible or electronic format, the assembly data may have to be manually entered such as through a keyboard interface or by scanning a printout of the data with an optical character recognition system.

For the lawn mower example, the populated assembly tables which would be generated are illustrated in FIG. 5. In this example, six different mower models having different model numbers are shown. Some of the subassemblies, e.g. blade and wheel, would include components which may be utilized in more than one mower model, and therefore, less than six subcomponents of blades and wheels would be shown in their respective tables. For example, "blade num" B16M may be utilized in both mower model numbers LM16G and LM16E. In the blade subassembly, only one entry for "blade num" B16M would be required.

The selection table generation process, as indicated at block 218, begins by determining selection criteria. Selection criteria are the factors which determine a part to be selected, and the selection criteria generally are elicited from experts in a particular technological field. In a lawn mower context and as shown in FIG. 6, a deck of a lawn mower, i.e. "deck num", would be selected based upon the "mower width" and the "LM motive power". Therefore, "mower width" and "LM motive power" are the "deck num" selection criteria. Likewise, and as also shown in FIG. 6, selection criteria for "wheel num" would be "mower width" and "deck matl". Selection criteria are determined for each subassembly.

Once the selection criteria are determined, the criteria are converted into a table format as indicated at block 220. As with the assembly model, the selection criteria model preferably is in the form generated by utilizing the Object Modeling Technique. In the lawn mower context, the selection criteria model which would be created is shown in FIG. 7. At this point, the selection tables would be empty, i.e. no assembly data is in the table. It should be apparent that while the assembly model tables would describe a wheel, the selection model tables would provide a format for choosing a wheel.

The next step, as indicated at block 224, is to determine a partial ordering for the selection tables. This partial ordering must be determined on an application specific basis. For example, in a motor context, one subassembly of a motor is an end shield. Generally, screws are utilized to mount the end shield to another part of the assembly. Before the type and number of screws can be selected, the type of end shield must be known. Therefore, the end shield selection process must be performed prior to the screw selection process. The partial ordering process may be performed by a human operator or may be automated. An automated partial ordering process, for example, may be performed by a computer implemented process. Expert knowledge generally is not required to perform the ordering process.

As a result of the above-described selection table generation process, a sequence of empty, partially ordered, selection database tables are generated. Further, as a result of the assembly table generation process, populated assembly database tables will have been generated. The next step as indicated at block 226 is to generate populated selection database tables. This step may be performed by determining all possible combinations of subassemblies utilizing the assembly table and selection table. For example, referring to FIG. 7 and in a lawn mower context, the deck selection table actually would be an expression of a logic rule. In the deck selection operation, the rule would be expressed as:

If "mower width" = A and "LM motive power" = B, then "deck num" = C.

For example, if the mower width is "16", and LM motive power is "gas", then the selected deck num will be "D16". By utilizing the "deck num" rule, and scanning the assembly table for all encountered combinations of the rule elements, e.g. "mower width" and "LM motive power", the selection tables would be populated.

More specifically, to populate the selection tables, e.g. the deck selection table, each combination of subassemblies which comprise rule elements of each rule would be determined. For example, for the deck selection rule, each combination of "mower width" and "LM motive power" would be copied from the assembly table to the selection table for deck selection.

Figure 8:
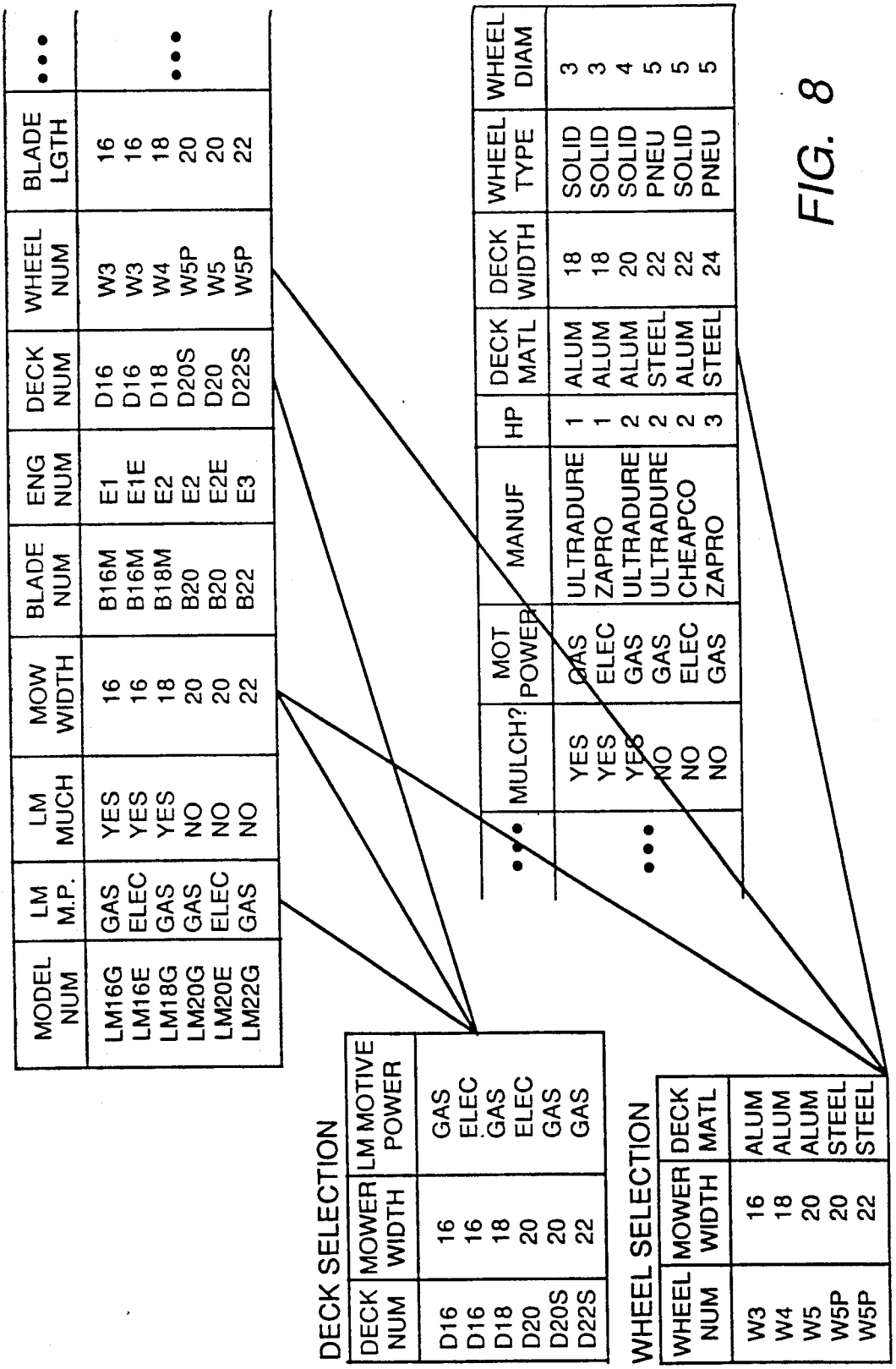
FIG. 8 illustrates an assembly table and populated selection criteria tables in accordance with the present invention.

Referring to FIG. 8, to populate the selection database tables, each row of the assembly tables would be scanned. Beginning with "model number" "LM16G", and with reference to the "Deck Selection" table, the computer would scan the first row of the table from left to right. During the first scan operation of the first row, the first rows of the "Deck Selection" and "Wheel Selection" tables would be populated. Once the scan operation for the first row is completed, the second row of the table would be scanned and the second row of the "Deck Selection" table would be populated.

In the "Wheel Selection" table, however, no row would be created during the second scan. Since the first and second scan operations contain identical information with regard to the "Wheel Selection" table, there would be no need for a new row in the "Wheel Selection" table for the second scan. This scanning process would be repeated for each row in the assembly table until all the rows have been scanned. The same process would be performed for each selection table. It should be understood that many more tables would be necessary to describe a lawn and necessary selection criteria. The result of these off-line operations would be a sequence of partially ordered, populated selection database tables.

The off-line process, as described above, may require a relatively long time period, e.g. weeks, to complete as compared to the time required for the on-line processes, e.g. minutes. The off-line processes of the present invention may, for example, be performed on and/or by a computer known in the art as a VAX 11/785, and generally are controlled by a human system user. The present invention may be utilized with most all commercially available computer systems, and it is contemplated that artificial intelligence techniques may be utilized in combination with the human-performed steps.

Briefly, during on-line operations, if a system user requires a bill-of-material for an assembly, the system user inputs into the system, through a user interface, design specifications. The selection rules are then applied to the input specifications as indicated at block 228. For example, and in a lawn mower context, a system user would enter the desired "mower width" and "LM motive power." From these design specifications, the system would select, from the selection tables, a "deck num" and "wheel num". If the design specifications include a "mower width" of "16" and a "LM motive power" of "gas", "deck num" "D16" would be selected and "wheel num" "W3" would be selected. Other subassemblies may require that further design specifications be entered by the system user to select a proper component.

Once each subassembly has been selected, a bill-of-material can be generated from the selected information and a print-out of the assembly model can be obtained as indicated at block 230. The assembly model print-out may be in one of many forms including in the form of a bill-of-material. Alternate print-out methods are described later with reference to FIG. 11. It is contemplated that rather than printing out the bill-of-material, the output of the present system could be electronically transferred to other computers for further processing. For example, in an assembly line, a number of computers may be located along the assembly line and portions of the bill-of-material, including assembly instructions, related to specific components could be transferred to computers at the respective locations where assembly of the specific components will occur.

Figure 9:
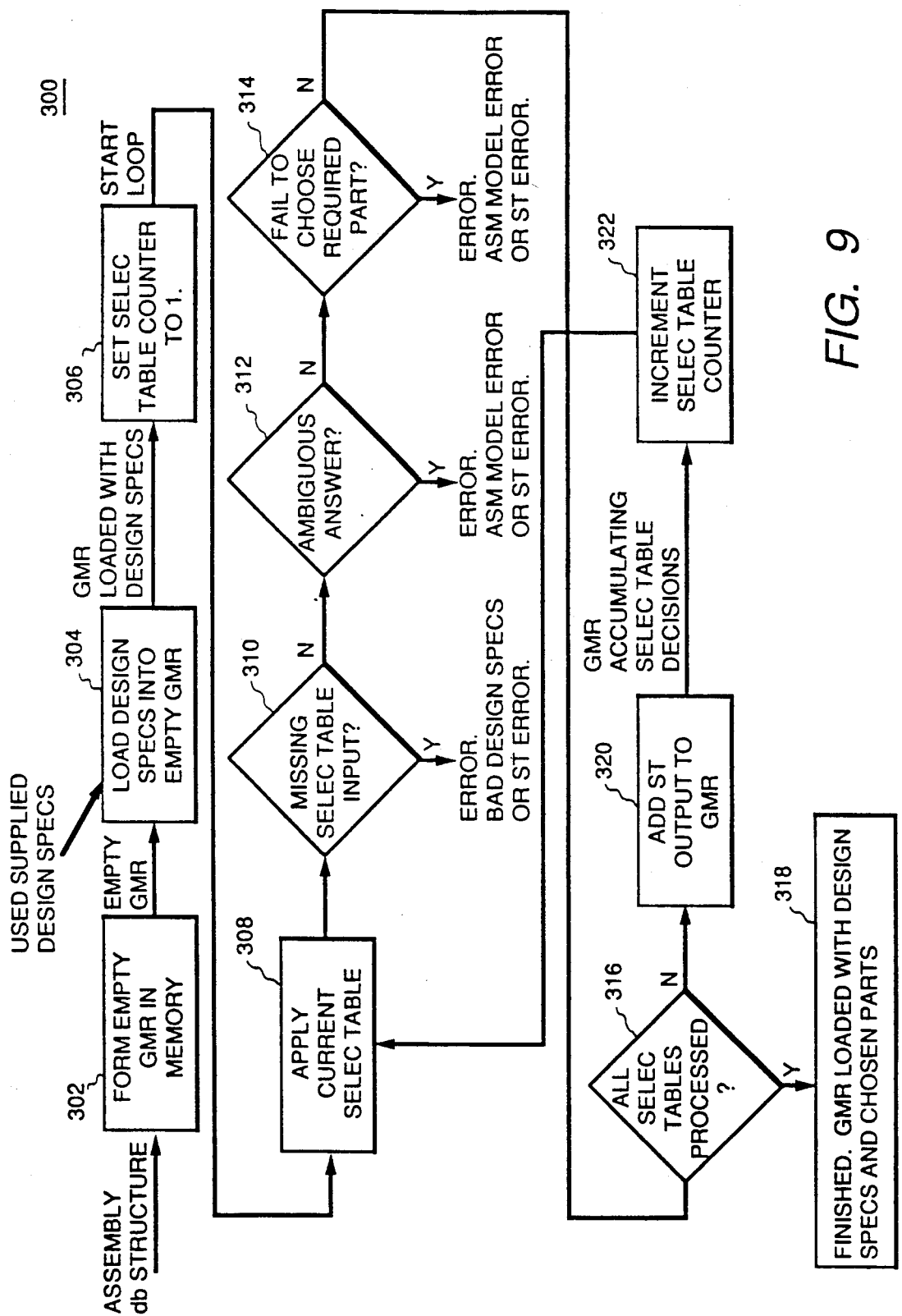
FIG. 9 illustrates one alternate method for operation of a user interface in accordance with the present invention.

Referring now to FIG. 9, a more detailed and one alternative method 300 for on-line operations is described. Method 300 illustrates the on-line operations in a batch mode. This means that user supplied design specifications are placed in memory, and then the design specifications are supplied to the system from the system memory. Specifically, the first step in method 300 is to form an empty assembly parts explosion (APE) in memory as indicated at step 302. An APE is a computer data structure having a memory location for every possible part that may be represented in the assembly. Then, user supplied design specifications are loaded into designated memory locations as indicated at step 304. Once the design specifications are loaded into memory, a selection table counter is set to equal 1 as indicated at block 306. Batch mode operation of the system then begins.

Specifically, the current selection table as indicated at block 308 receives the user supplied design specifications. From the rules expressed in the current selection table, the system determines the required input, i.e. design specifications, to select a component. If a required input to process the current selection table is missing, as indicated at block 310, then the system indicates to the user that the design specifications are bad, i.e. incomplete, or that a selection table (ST) error has occurred. If all of the input are available but an ambiguous answer results as indicated at block 312, then the system indicates to the user that an error has occurred and that the error is in the assembly model or is a ST error. If all of the inputs required for selection table operation are provided and if no ambiguous answer results, and if the system then fails to choose a required part as indicated at block 314, the system indicates to the user that an error has occurred and that the error is in the assembly model or an ST error. If an error occurs, the system user should then edit the assembly model and/or selection table to correct the error.

Other results subsequent to application of the current selection table also are contemplated. For example, in some assemblies, some components may be identified as "optional" components, and the selection table may include an "optional" or "don't need" indication for each optional component in each assembly. An example of an optional component in a motor context is "extra end turn insulation". Although required in some motor assemblies, the insulation is not required in all motor assemblies. An optional legend will be included in the selection table during selection table generation, and after application of a selection table for a motor assembly wherein insulation is not required, the system will provide an indication that the insulation is optional.

Further, it is contemplated that in some contexts, such as when a new combination of selection tables is being utilized, the system may not identify all required components, i.e. the location in the APE corresponding to the component will be empty. If this situation arises, then an expert in the technological area of the specific assembly, e.g. lawn mower expert, motor expert, etc., generally must provide information regarding the component which should be selected. The system user can then edit the selection table in accordance with the expert provided information.

If all the inputs required to process the current selection table are provided, and if the assembly model and selection table are properly generated as described above, the system processes the current selection table and identifies a component which meets the design specification. Processing a selection table comprises comparing the required input design specifications with the elements of the current selection table.

For example, and referring to FIG. 8, assume the wheel selection table is the table to be processed, i.e. the current selection table. Further, assume that design specifications requiring that the "mower width" be "20" and the "deck matl" be "steel" have been entered. The system then scans the selection table until it encounters a row which satisfies the design specifications, and then identifies the wheel corresponding to that row. In the present example, the design specifications match the row corresponding to "wheel num" "W5P" and therefore, wheel type "W5P" would be selected. This wheel type selection would then be transferred to the APE memory location corresponding to wheel type.

More specifically, if a required part is selected from processing the current selection table as explained above, the system then adds the selection table output to the APE as indicated at block 316. The system then proceeds to determine whether all the selection tables have been processed as indicated at block 318. This operation is determined by comparing the selection table counter to a predetermined number which indicates the number of selection tables which must be processed. The predetermined value is set to equal the number of selection tables to be processed, and the value may, for example, be assigned by the user after completion of generating populated selection tables, i.e. in off-line operations. If all the selection tables have been processed, then the operation is finished. At this point, the APE is loaded with all the design specifications and the chosen parts as indicated at block 320. If all the selection tables have not been processed, however, then the selection table counter is incremented as indicated at block 322. Operation then continues by returning to the step shown in block 308 and repeating the indicated operations.

Figure 10:
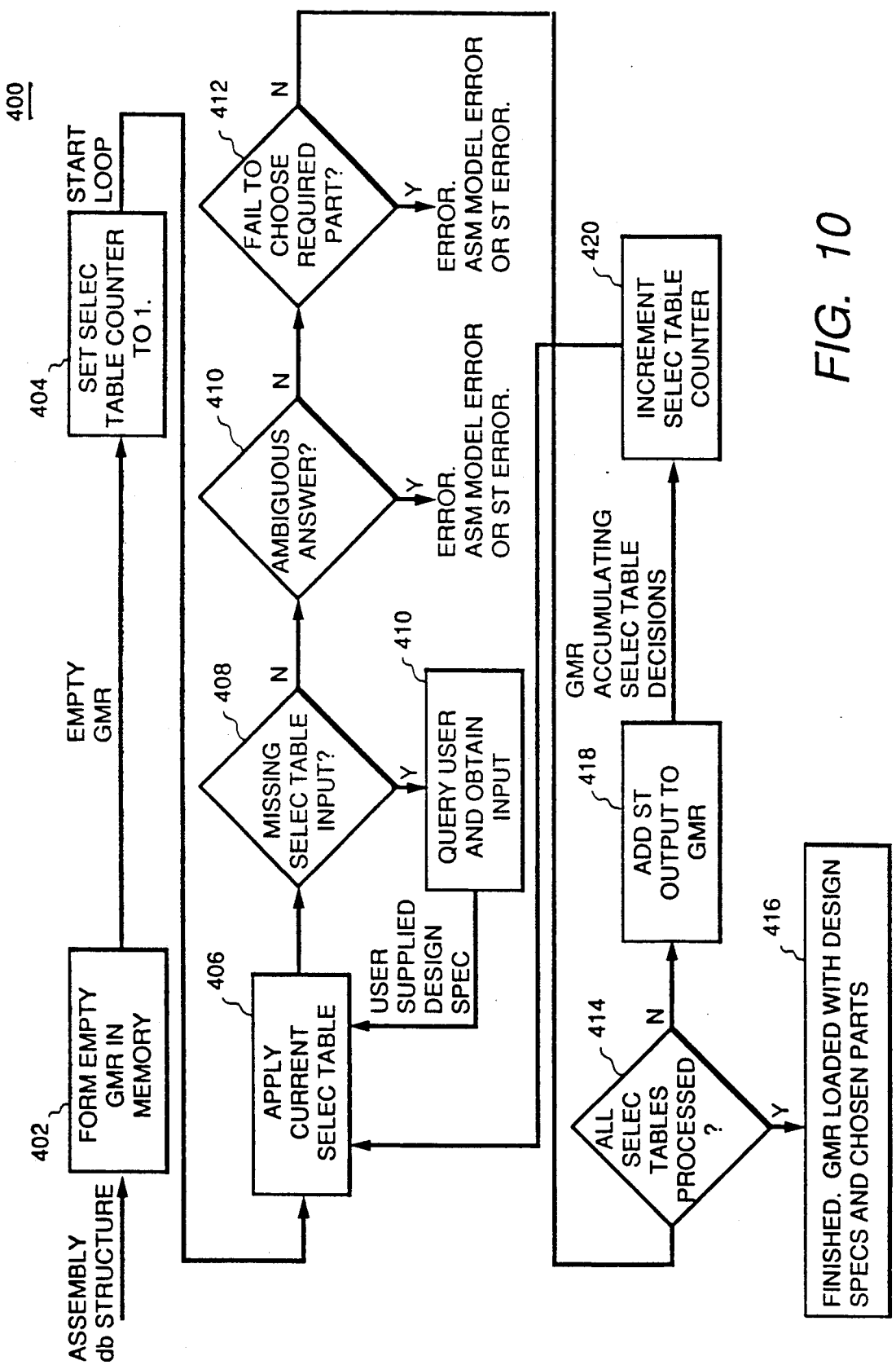
FIG. 10 illustrates another alternate method for operation of a user interface in accordance with the present invention.

Another alternative method 400 for on-line operations in accordance with the present invention is illustrated in FIG. 10. Method 400 generally is referred to as a user interactive operation because the user is queried for information required to select a part. Specifically, method 400 begins by forming an empty APE in memory as indicated at block 402. Then, a selection table counter is set to initially equal 1 as indicated at block 404. The system then applies a current selection table to determine a required part as indicated at block 406.

If information required to select the part is missing, as indicated at decision block 408, the system will query a user and obtain, usually through a user interface such as a keyboard, the required input from the user as indicated at block 410. In this operation, the system then returns to block 406 and again will apply a current selection table. If all the required information has not been provided, the system will continue looping until all the required information for selecting a specific component from the selection table is provided. Once the information is provided, and if the system obtains an ambiguous answer as indicated at block 412, the system indicates to a user that an error has occurred and that the error is an assembly model error or an ST error. If no such error has occurred, the system then continues to operations identified in block 414.

As indicated at block 414, if the system fails to choose a required part, the system indicates to the user that an error has occurred and that such error is an assembly model error or an ST error. If the system selects the required part, the next step, as indicated at block 416, is to add the selection table output to the APE. Then, as indicated at decision block 418, the next step is to determine whether all the selection tables have been processed. This is determined by comparing the value of the selection table counter to a predetermined value. If all the selection tables have been processed, then the system indicates, as is shown at block 420, that the operation is finished and the APE, at this point, will be loaded with the design specifications and the chosen parts. If all the selection tables have not yet been processed, the system then, as indicated at block 422 increments the selection table counter. Operation continues by returning to step shown in block 406. This process is repeated until all the selection tables have been processed or until an error occurs.

Figure 11:
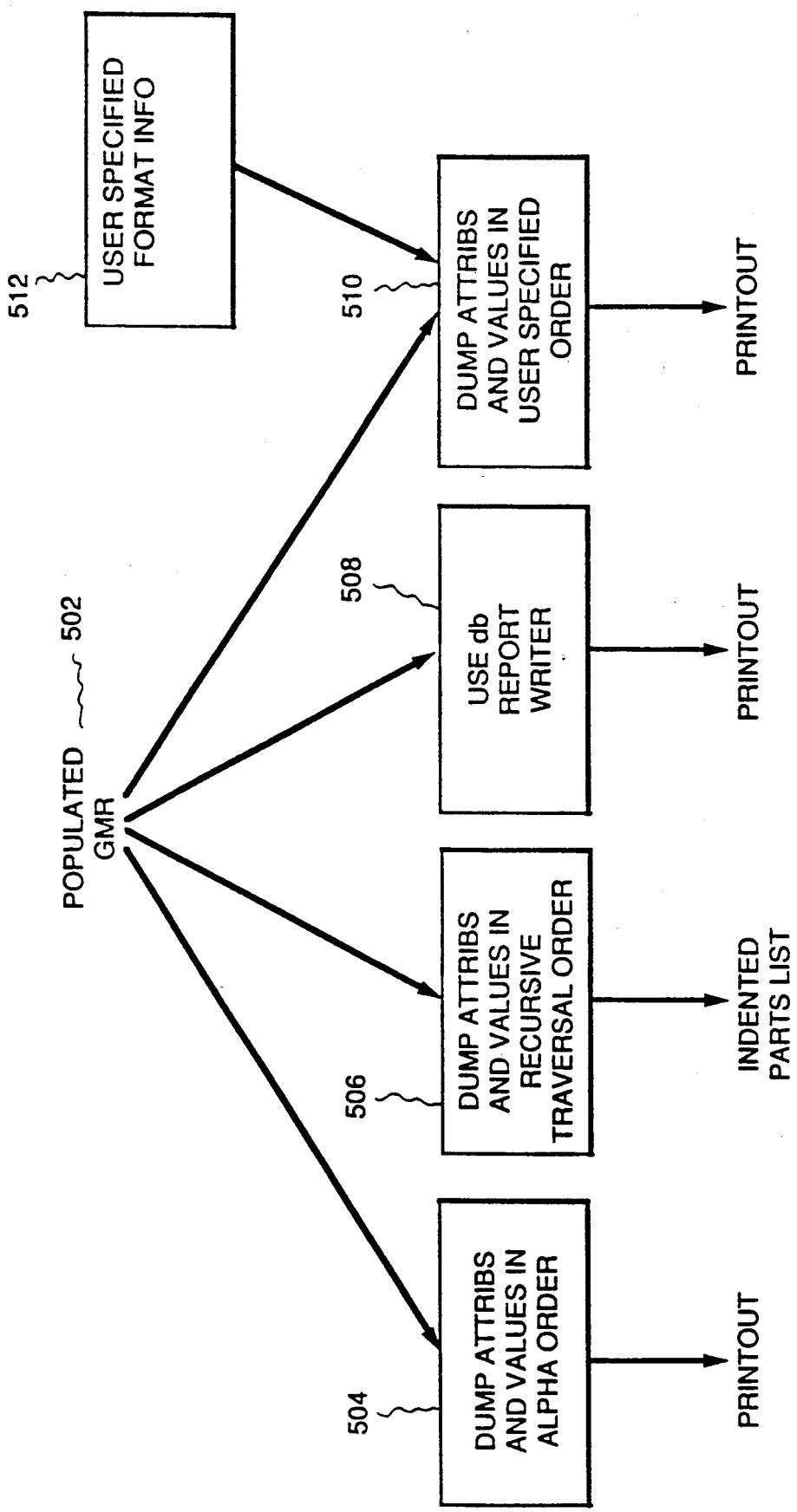
FIG. 11 illustrates alternate print-out methods in accordance with the present invention.

As shown in FIG. 11, once a populated APE has been generated as indicated at block 502, various methods for providing the information to a system user are possible. As illustrated in FIG. 11, the system may transfer all the attributes from the populated APE and each attribute value in alphabetical order as indicated in block 504. This alphabetical listing could then be printed out. Another option is to transfer the attributes from the populated APE and their values in a recursive transversal order as indicated at block 506. The result of printing out using this method is an indented parts list. This indented parts list is a bill-of-material.

Specifically, to print out the assembly in a bill-of-material format, the system would scan the assembly model table row corresponding to the selected model number. In a lawn mower context, if "model number" LM16G is selected, then the first row of the assembly table in FIG. 5 would be scanned from left-to-right. Once the scanner encounters a characteristics represented in a subassembly table, e.g., "blade num", then the system would scan the row corresponding to the selected subassembly in the table corresponding to the subassembly. To facilitate this operation, the unit of memory assigned to a characteristic represented in a subassembly table, in addition to a value assigned to the characteristic, would include the memory location of the subassembly table. The rows from the subassembly table would be indented to represent a hierarchy of information. For example, for model number LM16G, the following bill-of-material would be generated from the assembly table shown in FIG. 5:

```
model number = LM16G
    LM mot power = gas
    LM mulch = yes
    mower width = 16
    blade num = B16M
        blade length = 16
        mulch = yes
    eng num = E1
        mot power = gas
        manuf = Ultradure
        HP = 1
    deck num = D16
        deck matl = alum
        deck width = 18
    wheel num = W3
        wheel type = solid
        wheel diam = 3
```

Another alternative method for printing out the information contained in the populated APE is to use the database report writer as indicated at block 508. Further, as indicated at blocks 510 and 512, a user may have a specific format which is desired and the user may simply enter this format into the user interface as indicated at block 512. The attributes which are transferred and their corresponding values would then be printed out in the user specified order.

Further, as described earlier herein, the information or portions of information from the populated APE could be electronically transferred to another computer or series of computers for further processing. Many other uses of the information from the populated APE are possible and contemplated.

Importantly, it should be recognized that by utilizing the present invention, a bill-of-material can be quickly generated for an existing product or from new design specifications for a new or modified product. By using the stored data and selection rules, and by entering new design specifications, the system actually provides an assembly model for a new product. More specifically, and as explained above, the assembly data elements in the selection tables, which data was provided from previous known designs, are expressed as rules in the selection tables. These rules, extracted from previous designs, may be utilized to construct new products. The present invention constructs the new product design by combining existing assembly rules to identify a new combination of known assembly components. It is contemplated that the present invention may not be suitable for all new designs. For example, if the final design of an assembly depends critically on every new design specification and if changing one design specification results in a change to all the design specifications, then the past rules extracted from the previous designs may not be suitable.

If a variation of an existing model represented in the assembly table is generated by the selection tables, the system establishes another row in the assembly table and subassembly tables, if needed, to represent the new design. A bill-of-material is then generated from the new row.

From the foregoing discussion, it should be apparent that the present system generates, on-line, a bill-of-material from design specifications. This feature facilitates reducing the time required to bring a new or modified product to market. Further, the present invention facilitates electronic storage of all variations of specific assemblies and enhances the accuracy and consistency of design techniques. The system also automatically generates assembly heirarchies and automatically generates rules to guide construction of new or modified product. These features facilitate reducing the costs of bringing a product to market. The present invention also facilitates speed, simplicity and self-confidence in bringing a product to market.

Additional features, although not necessary for practicing the invention, have been found useful. Specifically, ambiguity may be present in the selection tables if one subassembly is utilized more than once in an assembly. For example, in a motor context, two end shields generally are utilized. One end shield is disposed at the motor drive end and another end shield is disposed at the end opposite the drive end. In order to properly generate a bill-of-material, the system must distinguish between the two end shields.

Figure 12:
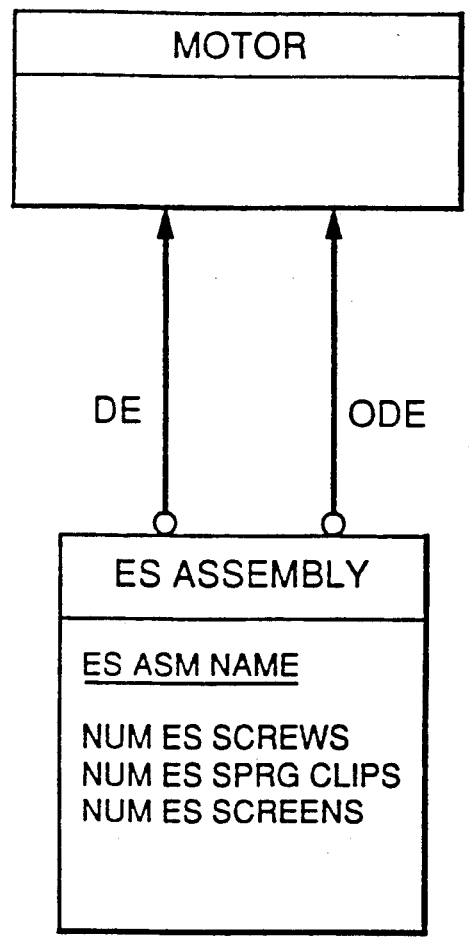
FIG. 12 illustrates an object structure which may be utilized in generating selection tables in accordance with the present invention.

To overcome this problem, "paths" are utilized, such as the path illustrated in FIG. 12. In FIG. 12, two paths labelled drive end "DE" and opposite drive end "ODE" are shown. In this manner, the system can distinguish, for example, between the number of end shield screws required for the DE end shield and the number of screws required for the opposite DE end shield.

To facilitate identification of where paths should be utilized, the assembly model should be in a directed acyclic, i.e. no loops, format. When the assembly model is in this format, a user can easily identify any ambiguity and eliminate the ambiguity when generating an object model.

Another feature which may be useful in practicing the present invention is to include assembly instructions with each identified component. For example, the type of tool and manner of attaching the component could be included in a comment field with each respective component. When the assembly is printed-out, the assembly instructions for each component also would be included. In this manner, production time may be even further reduced, especially if unexperienced workers are performing the actual assembly.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. An apparatus for selecting components for inclusion in the design of a final product assembly, said apparatus comprising:

means for representing rules for selecting an assembly component comprising selection criteria tables including selection criteria elements, each selection criteria element corresponding to an assembly component;

means for applying input design specifications to said selection criteria tables to select an assembly component; and means for providing an identification of selected assembly components to a system user.

2. An apparatus for identifying components in accordance with claim 1 wherein said applying means further comprises:

means for querying a system user to identify a selection criteria element required to select an assembly component; and means for inputting an identification of the element.

3. An apparatus for identifying components in accordance with claim 2 wherein said querying means operates in a user interactive format whereby a user supplies an element upon being queried by the system for the element.

4. An apparatus for identifying components in accordance with claim 2 wherein said querying means operates in a batch format whereby elements are stored in an electronic memory prior to initiating selection processes.

5. An apparatus for identifying components in accordance with claim 1 wherein said means for providing an identification of selected assembly components comprises a display means including printing means for generating a print-out of each selected component.

6. An apparatus for identifying components in accordance with claim 5 wherein said printing means prints out the selected components in a bill-of-material format.

7. An apparatus for identifying components in accordance with claim 5 wherein said printing means prints out the selected components in a user specified format.

8. An apparatus for identifying components in accordance with claim 5 wherein said printing means prints out the selected components in alphabetical order.

9. An apparatus for identifying components in accordance with claim 1 wherein said means for providing an identification of selected assembly components comprises a computer.

10. A computer implemented process for identifying components of an assembly, a computer upon which said process is to be operated comprising a data base including an assembly table, said process comprising the steps of:

populating selection criteria tables with rules for selecting assembly components, said rules derived from said assembly table;

inputting to the selection table design specifications of an assembly;

selecting a component by processing said selection table; and identifying a selected assembly component to a system user.

11. A computer implemented process in accordance with claim 10 further comprising the steps of:

querying a system user regarding an element required to select a component; and inputting an identification of the element.

12. A computer implemented process in accordance with claim 10 wherein identifying the selected assembly component comprises the step of printing selected assembly components in a bill-of-material format.

13. A computer implemented process in accordance with claim 10 wherein identifying the selected assembly component comprises the step of printing selected assembly components in a user specified format.

14. A computer implemented process in accordance with claim 10 wherein identifying the selected assembly component comprises the step of displaying selected assembly components on a computer screen.

* * * * *